(12) United States Patent
Uehara

(10) Patent No.: US 6,422,366 B1
(45) Date of Patent: Jul. 23, 2002

(54) POWER TRANSMITTING APPARATUS

(75) Inventor: Tadayoshi Uehara, Sagamihara (JP)

(73) Assignee: UGK, Inc., Kanagawa-ken (JP)

( * ) Notice: Subject to any disclaimer, the term of this patent is extended or adjusted under 35 U.S.C. 154(b) by 0 days.

(21) Appl. No.: 09/709,489

(22) Filed: Nov. 13, 2000

(51) Int. Cl.[7] .............................................. F16D 41/04

(52) U.S. Cl. ..................... 192/48.92; 192/41 S; 192/45; 192/105 BA

(58) Field of Search .................. 192/41 S, 45, 192/48.92, 48.3, 105 R, 103 R, 105 BA; 74/335, 359

(56) References Cited

U.S. PATENT DOCUMENTS

| | | | | | |
|---|---|---|---|---|---|
| 4,913,274 A | * | 4/1990 | Nishimura | ................ | 192/84 T |
| 5,000,057 A | * | 3/1991 | Tseng | ........................ | 74/359 |
| 5,022,505 A | * | 6/1991 | Io | ...................... | 192/48.92 X |
| 5,135,086 A | * | 8/1992 | Ciolli | ...................... | 192/41 S |

* cited by examiner

Primary Examiner—Rodney H. Bonck
Assistant Examiner—Saúl Rodríguez
(74) Attorney, Agent, or Firm—Townsend & Banta

(57) ABSTRACT

The present invention provides a power transmitting apparatus having a continuously variable transmitting function which is effective as a transmission for an automobile. This power transmitting apparatus, which may be used as an automobile transmission, utilizes a winding effect of transmitting coils wrapped around a drum.

2 Claims, 6 Drawing Sheets

POWER TRANSMITTING APPARATUS

FIELD OF THE INVENTION

The present invention relates to a power transmitting apparatus having a continuously variable transmitting function capable of greatly increasing engine efficiency as an automobile transmission. More particularly, the present invention relates to a power transmitting apparatus which utilizes a winding effect of transmitting coils with respect to a drum.

BACKGROUND OF THE INVENTION

Conventionally, various power transmitting apparatuses having a gear-type transmission capable of converting revolution speed and transmitting torque of an output shaft in accordance with a load of a drive source have been used. In automobile transmissions, a gear-type transmission is normally connected to an engine through a clutch and a torque converter, and the speed of an output side is altered by changing the gear ratio.

However, in conventional power transmitting apparatuses, since speed is changed stepwisely by meshing gears, the speed change range is narrow. In order to widen the range, a large number of combinations of gears are required and, accordingly, the structure of the apparatus becomes very complicated.

For this reason, in the case of automobile transmissions, three- to four-stage speed changes are commonplace. However, with such a speed change, the engine revolution number is varied greatly whenever the speed is changed and, especially whenever the automobile is accelerated, the speed is increased from a low-speed range and thus the speed cannot be accelerated at the most efficiently revolution number, i.e., a large load is applied to the engine and much energy is lost.

In the case of a transmission using a torque converter, although a manual speed change operation is unnecessary, since a fluid pressure mainly using oil is utilized for transmitting power, power transmitting efficiency at the time of acceleration is inferior, and since most of engine output is consumed as heat even at the time of constant speed running, energy loss is great and efficiency is inferior.

SUMMARY OF THE INVENTION

The present invention has been accomplished in view of the above circumstances, and it is an object of the present invention to provide a power transmitting apparatus which has a continuously variable transmitting function of wide speed change range with a simple structure, and which is suitable as a transmission for an automobile capable of efficiently transmitting a power of a drive source.

To achieve the above object, according to the present invention, there is provided a power transmitting apparatus comprising a rotation shaft which obtains a power of a drive source and rotates in a predetermined direction, a drum fixed to an outer periphery of the rotation shaft, helical transmitting coils mounted on an outer periphery of the drum at constant clearances from one another, a driving wheel and a follower wheel rotatably provided on opposite side of the drum with the transmitting coils interposed therebetween, and a variable-speed motor for rotating the driving wheel in the same direction as the drum, in which a power of the drum is intermittently output to the follower wheel in a pulse transmitting manner through the transmitting coils by controlling a speed of the variable-speed motor, wherein each of the transmitting coils has a spring property, one ends of the transmitting coils engage the driving wheel and the other ends engage the follower wheel, when a tensile force caused by rotation of the driving wheel is applied to the one ends of the transmitting coils, the transmitting coils are wound around the outer periphery of the drum, thereby rotating the follower wheel in the same direction as the drum, the follower wheel is mounted on the rotation shaft through a one-way clutch such that the revolution number of the follower wheel does not exceed the revolution number of the drum, and when the revolution number of the follower wheel exceeds a predetermined revolution number of the drum, a centrifugal clutch for rotating the driving wheel at the same speed as the drum is provided.

Further, in the power transmitting apparatus, the driving wheel comprises annular portion for surrounding the centrifugal clutch and teeth receiving a power from the variable-speed motor, the driving wheel is connected to the variable-speed motor through a transmission system having gear meshing the teeth, and the transmission system includes excessive load-preventing means for idling the gear when the power is transmitted from the side of the driving wheel to cut off the transmission of power to the variable-speed motor.

DESCRIPTION OF THE PREFERRED EMBODIMENT

Figure 1:
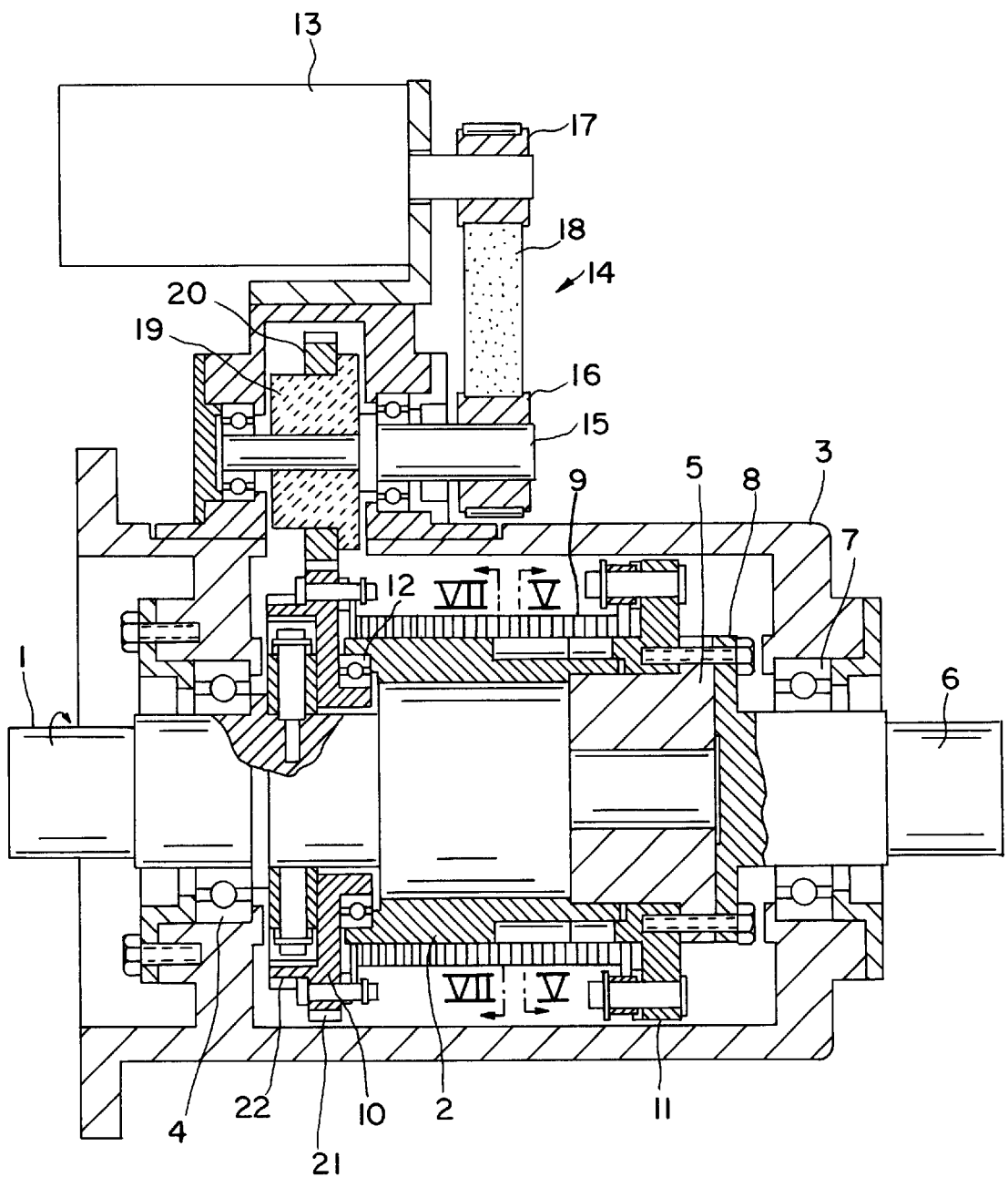
FIG. 1 is a partial sectional view showing a preferred example of a power transmitting apparatus according to the present invention.

In a preferred example of the present invention as shown in FIG. 1, a rotation shaft 1 (input shaft), whose first end is connected to an automobile engine or other drive source (not shown), is rotated in a predetermined direction. The rotation shaft 1 passes through the center of a drum 2 and one end of the rotation shaft 1 is rotatably supported by a bearing 4 fixed to a housing 3.

An output shaft 6 is connected to the second end of the rotation shaft 1 through a one-way clutch 5 in series. This output shaft 6 is also rotatably mounted to the housing 3 through a bearing 7. The first end of the output shaft 6 is formed with a flange 8 and fixed to an outer periphery of the one-way clutch 5 by a bolt or the like. The rotation shaft 1 is fitted into an inner periphery of the one-way clutch 5 having a ratchet (not shown) such that the rotation shaft 1 is rotated (idled) in the same direction as the drive source. That is, the one-way clutch 5 idles in a direction opposite that of the rotation shaft 1, such that when the one-way clutch 5 is rotated reversely, the rotation shaft 1 can be locked into the one-way clutch 5, so that both elements can be rotated in the same direction.

The drum 2 is fixed to an outer periphery of the rotation shaft 1 so that the drum 2 rotates in the same direction as the rotation shaft 1. The drum 2 comprises a cylindrical body whose outer periphery is cured by thermal treatment or the like, and helical transmitting coils 9 are mounted to the outer periphery of the drum 2 through a constant clearance from one another of at least 0.1 mm.

Each of the transmitting coils 9 is a metal wire having a rectangular cross section, and a diameter thereof is set such that an output side of the transmitting coil 9 is thicker than an input side thereof so that stress is applied to each of the cross sections equally when a power is transmitted. The transmitting coil 9 is wound towards the output shaft 6 and its winding direction is opposite from that of the rotation direction of the drum 2. Importantly, each of the transmitting coils 9 has a spring property which is expandable in its radial direction.

The transmitting coil 9 is usually immovable at a constant distance from the drum 2, but when a tensile force is applied to one end of the transmitting coils 9, the coil winds around an outer periphery of the drum 2 so as to transmit power (rotational energy) of the drum 2 to the output shaft 6. The rotation shaft 1 is formed with a lubricant passage to be connected to an oil pump (not shown), and the passage is extended to an outer peripheral face of the drum 2 so that a lubricant is constantly supplied between the drum 2 and the transmitting coil 9. Traction oil whose viscosity is abruptly increased under high pressure, is used as the lubricant.

A driving wheel 10 having an outer periphery with teeth 21, for applying a tensile force to one end of the transmitting coil 9, and a follower wheel 11, driven by the transmitting coil 9, are rotatably provided on opposite sides of the drum 2. The driving wheel 10 and the follower wheel 11 are opposed to each other, with the transmitting coil 9 interposed therebetween. One end of the transmitting coil 9 engages a portion of the driving wheel 10, and the other end of the transmitting coil 9 engages with a portion of the follower wheel 11.

The follower wheel 11 is fixed to the outer periphery of the one-way clutch 5, and is rotatably mounted on the rotation shaft 1 through the one-way clutch 5. The driving wheel 10 is mounted to one end of the drum 2 through a bearing 12, and is rotated in the same direction as the drum 2 when power is transmitted thereto. A variable-speed motor 13 comprising a stepping motor, an AC servo motor, or other control motor used for rotating the driving wheel 10 is mounted outside of the housing 3 and is indirectly connected to the driving wheel 10 through a drive system 14.

The drive system 14 comprises a rotation shaft 15 mounted to the housing 3, a timing belt 18 connecting a pulley 16 fixed to one end of the rotation shaft 15 and a pulley 17 fixed to a driving shaft of the variable-speed motor 13, a one-way clutch 19, which acts as an excessive load-preventing means mounted to the rotation shaft 15 for cutting off the transmission of power to the variable-speed motor 13 from the driving wheel 10, and a gear 20 fixed to the outer periphery of the one-way clutch 19. The gear 20 meshes with the outer periphery of the driving wheel 10 the teeth 21 being formed at the outer face of the driving wheel 10, with an annular portion 22 surrounding a centrifugal clutch 23.

Figure 2:
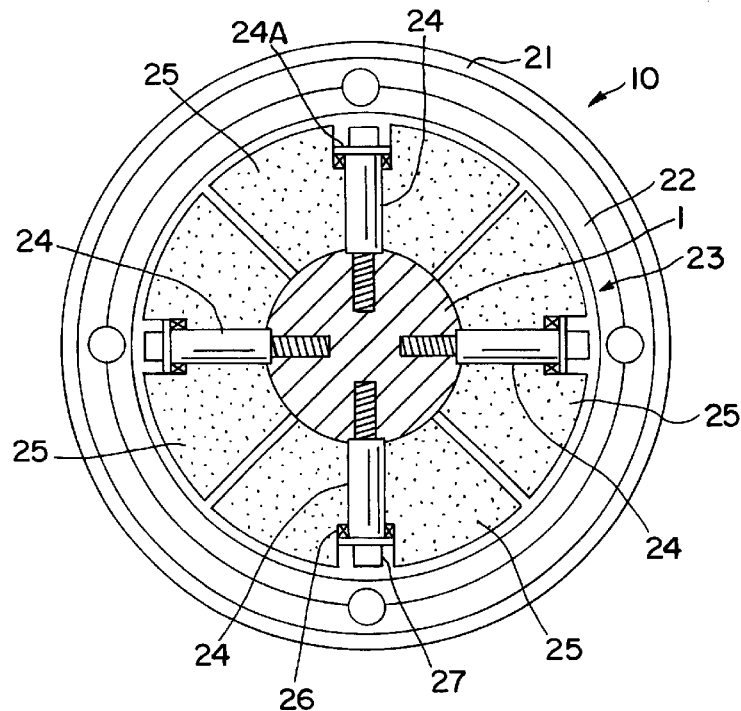
FIG. 2 is a sectional view of a centrifugal clutch of the present invention.

As shown in FIG. 2, the centrifugal clutch 23 comprises guide shafts 24 radially fixed to the rotation shaft 1 in the vicinity of the driving wheel 10, slide tops 25 respectively sliding along the guide shafts 24, and pressure-adjusting springs 26 for biasing the slide tops 25 inward. Each of the pressure-adjusting springs 26 is interposed between a bottom portion of a notch 27 formed in the slide top 25 and a flange 24A of the guide shaft, and when the revolution number of the drum 2 exceeds a predetermined value (e.g., 3000 RPM), each of the slide tops 25 is brought into contact with an inner peripheral face of the annular portion 22 through pressure exerted by the resilient force of the pressure-adjusting springs 26, thereby rotating the driving wheel 10 in the same direction as the drum 2 instead of the variable-speed motor 13.

Figure 3:
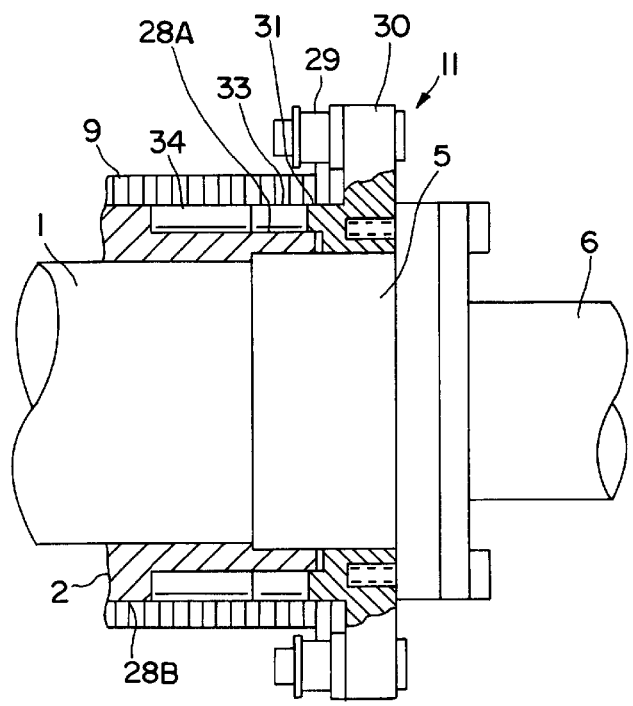
FIG. 3 is a partial sectional view of one side of a drum of the present invention.

As shown in FIG. 3, an outer periphery of a portion of the drum 2 closer to the follower wheel 11 is reduced in diameter as a small-diameter portion 28A having a constant diameter. Here, the follower wheel 11 is integrally formed with a flange 30 to which a lock pin 29 for locking one end of the transmitting coil 9 is attached, and a cylindrical receiving opening 31 is slidably fitted in the small-diameter portion 28A of the drum 2.

Figure 4:
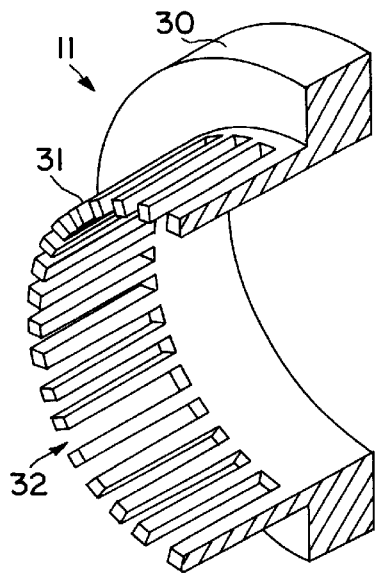
FIG. 4 is a partial perspective view of the present invention of a follower wheel.
Figure 5:
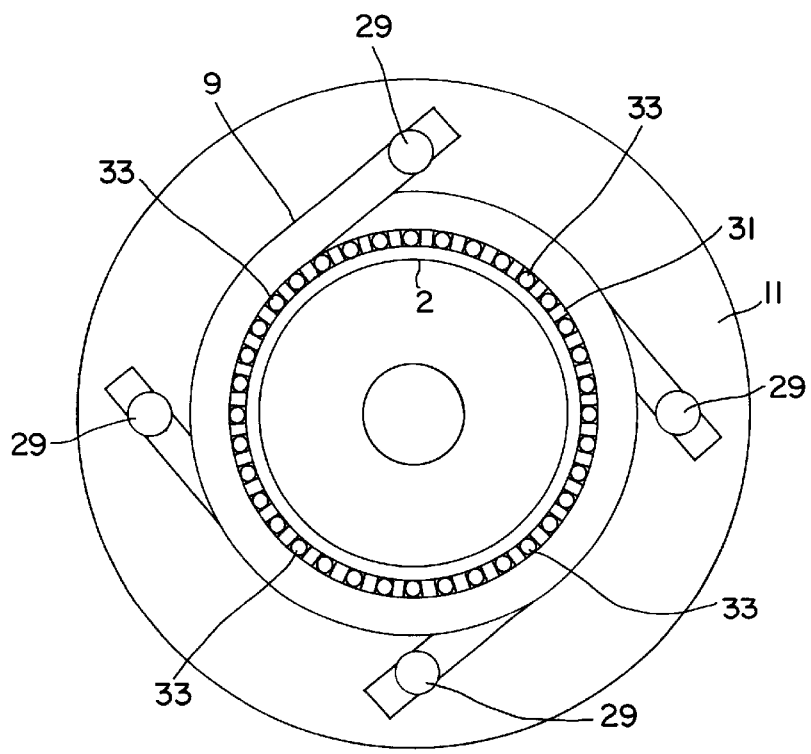
FIG. 5 is a schematic sectional view taken along the line A—A of the apparatus shown in FIG. 1.

As shown in FIG. 4, the receiving opening 31 is formed with slits 32 extending in an axial direction of the receiving opening 31 at equal distances from one another in the circumferential direction. As shown in FIG. 5, a rolling pin 33 is rotatably accommodated in each of the slits 32 such that the rolling pins 33 surround the drum 2.

Figure 6:
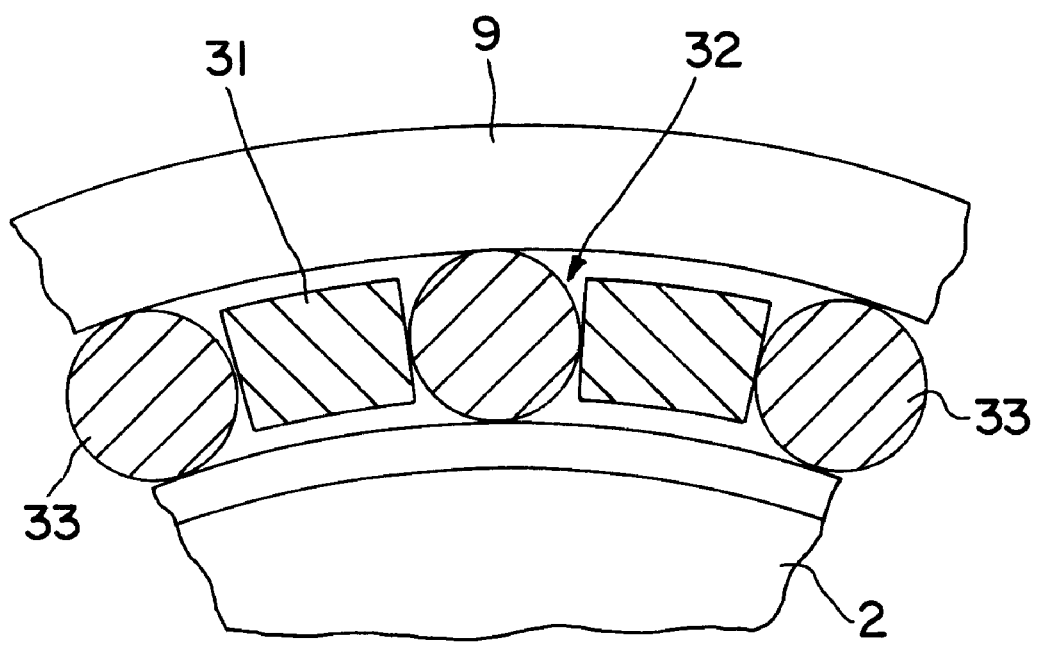
FIG. 6 is a partial enlarged view of the apparatus shown in FIG. 5.

As shown in FIG. 6, an inner diameter of the receiving opening 31 is greater than the small-diameter portion 28A of the drum 2, and an outer diameter of the receiving opening 31 is equal to or smaller than a large-diameter portion 28B of the drum 2. A diameter of the rolling pin 33 is greater than a thickness of the receiving opening 31, and when the transmitting coil 9 is scaled down in its radial direction to wind around the outer periphery of the drum 2, outer peripheral faces of the rolling pins 33 come into contact with the inner peripheral face of the transmitting coil 9 and the small-diameter portion 28A of the drum 2.

Therefore, when the transmitting coil 9 is wound around the outer periphery of the drum 2, the rolling pins 33 are moved in the rotational direction by the contact pressure with the drum 2, and push side walls of the slits 32 in the same direction. As a result, the power of the drum 2 is efficiently transmitted to the follower wheel 11 by action of the transmitting coil 9 and the rolling pins 33. When the transmitting coil 9 is restored to its original position, the transmitting coil 9 approaches the rolling pins 33 to prevent the rolling pins 33 from dropping out of the slits 32. As shown in FIG. 5, four transmitting coils 9 are mounted on the outer periphery of the drum 2, and an end of each of the transmitting coils 9 is locked to the follower wheel 11 through a lock pin 29.

Figure 7:
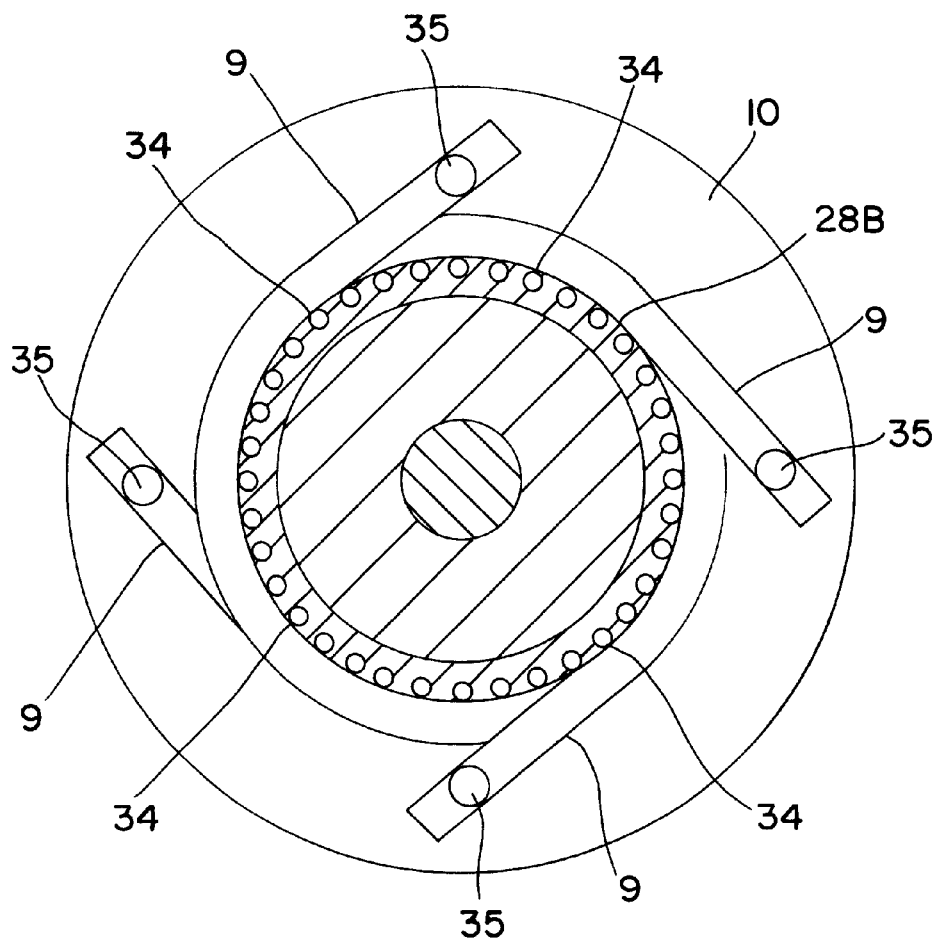
FIG. 7 is a schematic sectional view taken along the line B—B in FIG. 1.
Figure 8:
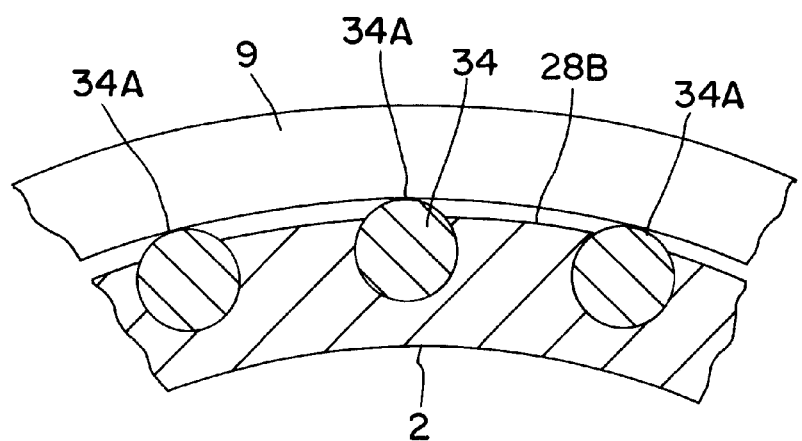
FIG. 8 is a partial enlarged view of the apparatus shown in FIG. 7.

On the other hand, as shown in FIG. 3, pins 34 are press-fitted into the large-diameter portion 28B of the drum 2 adjacent to the small-diameter portion 28A from the side of the small-diameter portion 28A. As shown in FIG. 7, the pins 34 are arranged around the entire circumference of the large-diameter portion 28B at equal distances from one another. In particular, as shown in FIG. 8, the pins 34 partially project from the outer peripheral face of the drum 2 to form projections 34A of about a few hundred μm, and an inner peripheral face of the transmitting coil 9 wound around the drum 2 is brought into contact with the projections 34A under pressure. Therefore, the transmitting coil 9 is wound around the drum 2 at its one side, with an extremely high traction coefficient, thus avoiding almost any slip, so that the power can be smoothly transmitted to the follower wheel 11. As shown in FIG. 7, ends of the transmitting coils 9 are locked to the driving wheel 10 through lock pins 35.

The operation of the power transmitting apparatus having the above-described structure will now be explained. First, if the drive source (not shown) is operated, the rotation shaft 1, which is directly connected to the drive source, receives power from the drive source which rotates it in a predetermined direction (e.g., in the direction shown by the arrow in FIG. 1), thereby rotating the drum 2 fixed to the outer periphery of the rotation shaft 1 in the same direction. When this revolution number is low, e.g., lower than 3,500 RPM, the centrifugal clutch 23 is not operated (engaged), nor does the driving wheel 10 receive power from the variable-speed motor 13. Thus, the transmitting coil 9 maintains a normal state without winding around the drum 2, causing the output shaft 6 to remain motionless.

In order to transmit power to the output shaft 6, the variable-speed motor 13 is operated to rotate the driving wheel 10 in the same direction as the drum 2. At this time, the speed of the variable-speed motor 13 is controlled such that the driving wheel 10 rotates at a lower speed than the drum 2. With this control, one end of the transmitting coil 9 is pulled by the driving wheel 10, which rotates in the same direction as the drum 2, and as a result, the transmitting coil 9 is scaled down in the radial direction and wound around the outer periphery of the drum 2.

Therefore, the power of the drum 2 is output to the follower wheel 11 which is connected to the other end of the transmitting coil 9, and the output shaft 6 connected to the follower wheel 11 is thus rotated in the same direction as the drum 2. Here, a force F applied from the transmitting coil 9 to the follower wheel 11 is expressed as "$F=fxe^{2\pi\mu n}$" wherein a tensile force by the driving wheel 10 is expressed as f ($\mu$; friction coefficient between the transmitting coil and the drum, and n; the number of turns of winding).

Since the revolution number of the drum 2 at that time is higher than that of the driving wheel 10, the transmitting coil 9 wound around the drum 2 is restored immediately after the power is transmitted to the follower wheel 11, and separated from the outer periphery of the drum 2, but since the tensile force remains on the one end of the transmitting coil 9, the winding motion of the transmitting coil 9 around the drum 2 is intermittently repeated even after the transmitting coil 9 is restored. As a result, the power of the drum 2 is intermittently output to the follower wheel 11 through the transmitting coil 9 in a pulse manner and, thus, the output shaft 6 keeps rotating by the pulse transmission.

Figure 9:
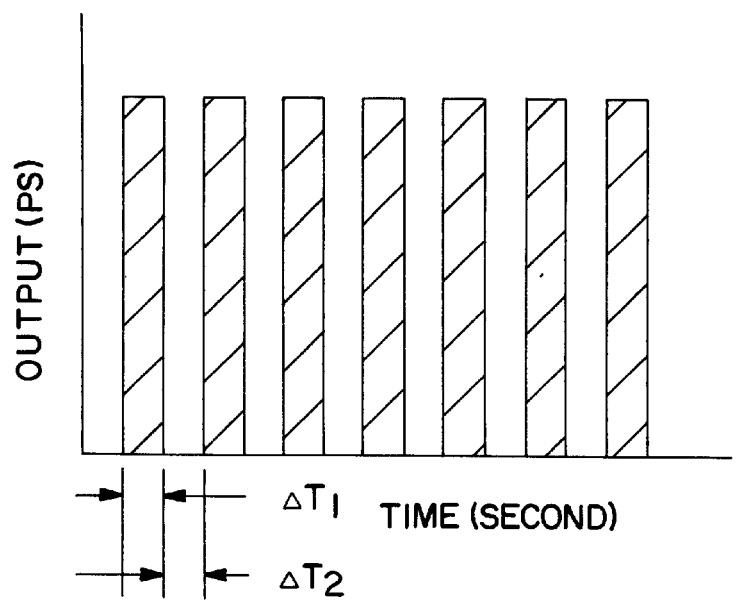
FIG. 9 is a graphical representation showing a state in which power is transmitted in a pulsed manner by transmitting coils.

As shown in FIG. 9, the vertical axis shows output when a power is transmitted by the transmitting coil 9, and the horizontal axis shows time. It can be seen that when the transmitting coil 9 is wound around the drum 2, output is generated in the follower wheel 11 during the time ΔT1, and this output is periodically repeated after every other idling time ΔT2 at the time of restoration of the transmitting coil 9. While such a pulse transmission is repeated, the power of the drum 2 is applied to the output shaft 6 through the follower wheel 11, and this transmission of power is related to the idling time ΔT2.

If the idling time is reduced, the power transmitted per unit time is, naturally, increased. The idling time ΔT2 is inversely proportional to the speed of the variable-speed motor 13. That is, if the power output (speed) of the variable-speed motor 13 is reduced, a difference in speed between the drum 2 and the driving wheel 10 is increased, and the idling time, i.e., a state in which the transmitting coil 9 is separated from the drum 2 becomes longer.

Figure 10:
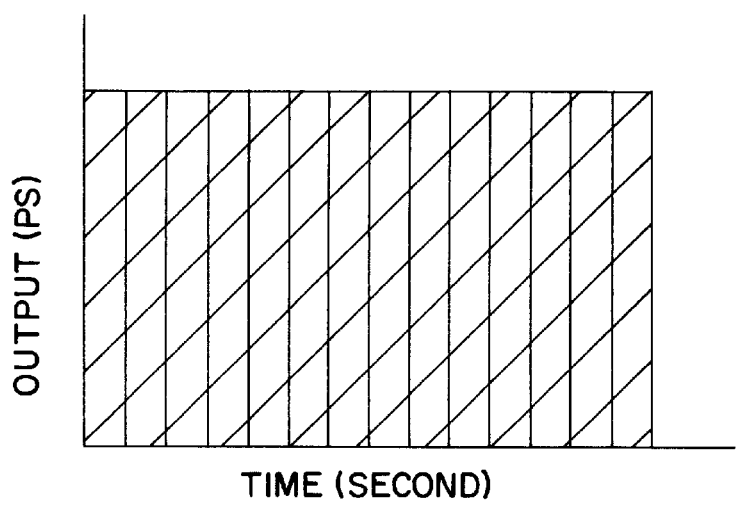
FIG. 10 is a graphical representation showing where power is output by the transmitting coils with almost 100% efficiency.

If the speed of the variable-speed motor 13 is increased to reduce the difference in speed between the drum 2 and the driving wheel 10, the idling time is reduced. As shown in FIG. 10, if the speed of the variable-speed motor 13 is increased until the speed of the driving wheel 10 becomes equal to that of the drum 2, the idling time becomes zero, i.e., the transmitting coil 9 is always wound around the drum 2 without separating from the drum 2, and the power is continuously transmitted to the output shaft 6 from the follower wheel 11 with almost 100% efficiency. According to the apparatus of the present application, even when the revolution number of the drum 2 and by extension, that of the drive source, is constant, the speed of the output shaft 6 can be changed within a range up to the revolution number of the drum 2 by the speed control of the variable-speed motor 13.

It is assumed that a tolerance maximum revolution number of the drive source is 7,000 RPM, a speed control limit of the variable-speed motor 13 is 4,500 RPM/400 W, and the number of revolutions of the drive source exceeds the speed control limit of the variable-speed motor 13 and rotates at a high speed. In such a case, the centrifugal clutch 23 is operated within a boundary of the threshold value of the centrifugal clutch 23. The slide tops 25 of the centrifugal clutch 23 may rotate the driving wheel 10 in cooperation with the variable-speed motor 13 while contacting with the inner face of the annular portion 22 of the driving wheel 10 even in a speed control region of the variable-speed motor 13, but the operation of the centrifugal clutch 23 mentioned here means an operation for rotating the driving wheel 10 at the same speed as the drum 2 in a state in which the slide tops 25 does not slide with respect to the driving wheel 10, and the slide tops 25 are in complete contact with the driving wheel 10 under pressure.

At this time, the transmitting coil 9 is wound around the outer periphery of the drum 2 without separating from the drum 2, and the power of the drum 2 is output to the follower wheel 11 with 100% efficiency to rotate the output shaft 6. At that time, since the revolution number of the driving wheel 10 is higher than that of the variable-speed motor 13 (the revolution number of the gear 20 to be precise), the power is not transmitted from the gear 20 to the driving wheel 10, but the power is transmitted from the driving wheel 10 to the gear 20.

However, the gear 20 idles by operation of the one-way clutch 19 to cut off the power transmission and prevent applying a load to the variable-speed motor 13. In this case, the variable-speed motor 13 may keep rotating, but it is preferable to stop the variable-speed motor 13 by feeding-back the revolution number of the drum 2 to the variable-speed motor 13 through detection of a rotary encoder.

When using the present invention as a transmission for an automobile, one end of the rotation shaft 1 of the apparatus is connected to a crankshaft of the automobile engine, and the output shaft 6 is connected to the drive shaft of the automobile to constitute an automatic transmission. If the most efficient revolution number of the automobile engine is 3,000 RPM, and the maximum revolution number of the engine is limited to 3,000 RPM by a computer until the vehicle speed reaches 50 Km/hr, the effective revolution number with which the centrifugal clutch 23 is operated is set to, e.g., 3,500 RPM, which is higher than the maximum revolution number. A speed reduction ratio of the variable-speed motor 13 with respect to the driving wheel 10 is set to 1, and the maximum speed control limit of the variable-speed motor 13 is set to 4,500 RPM/400 W, which is higher than the effective revolution number of the centrifugal clutch 23. A control circuit is provided such that when the engine is operated, a dynamo is operated to obtain electric power from the variable-speed motor 13, and when an accelerator pedal is operated, the variable-speed motor 13 follows the revolution number of the engine, with a predetermined acceleration, with a constant time lag.

When starting the above engine, first, when the accelerator pedal is depressed, causing the revolution number of the engine to increase in direct proportion to the accelerator depression with almost no load up to 3,000 RPM, the revolution number of the drum 2 reaches the same value, and the variable-speed motor 13 starts substantially in synchronously with this. With this operation, the winding operation and separating operation of the transmitting coil 9 around and from the drum 2 is repeated, and the power of the drum 2 is intermittently output to the follower wheel 11 in a pulsed manner.

Therefore, the output shaft 6, which is directly connected to the follower wheel 11, receives power and is accelerated in proportion with the operation of the variable-speed motor 13, and when the speed of the variable-speed motor 13 (the driving wheel 10 to be precise) reaches that of the drum 2, the output shaft 6 receives power from the drum 2 through the transmitting coil 9 with almost 100% efficiency, rotates at equal speed and runs at a constant speed.

During running of the vehicle within the speed control range of the variable-speed motor 13, if the vehicle speed exceeds 50 Km/Hr, the limit of the engine revolution number is released under the above-described conditions. At that time, if the engine revolution number is 3,500 RPM or lower, the power transmission by the variable-speed motor 13 is continued, but if the engine revolution number climbs above 3,500 RPM, the centrifugal clutch 23 is engaged, and the centrifugal clutch 23 rotates the driving wheel 10 at the same speed and in the same direction as the drum 2 instead of the variable-speed motor 13.

As a result, the transmitting coil 9 is always wound around the drum 2 to transmit the power of the drum 2 from the follower wheel 11 to the output shaft 6 with almost 100% efficiency. The power transmission to the variable-speed motor 13 at that time is cut off by the one-way clutch 19, and if the output shaft 6 attempts to rotate faster than the drum 2 by an inertial force, the drum 2 is rotated from the side of the output shaft 6 by the one-way clutch 5, and the drum 2 and the follower wheel 11 are rotated synchronously such that the pushing force of the follower wheel 11 is not applied to the one end of the transmitting coil 9. If a braking force is applied to the output shaft 6 by operation of a brake pedal in this state, since a tensile force is applied to the one end of the transmitting coil 9 by the follower wheel 11, the transmitting coil 9 is strongly wound around the drum 2 to apply the braking force to the drum 2. Therefore, the drum 2 is decelerated, and when the drum 2 is decelerated to a non-operable region of the centrifugal clutch 23, the transmitting coil 9 is restored and only the drum 2 idles.

When the accelerator pedal is not depressed during running of the vehicle by the variable-speed motor 13, it is preferable to stop the variable-speed motor 13. At that time, the one end of the transmitting coil 9 is pushed by the follower wheel 11, and the transmitting coil 9 idles around the outer periphery of the drum 2. That is, even if the variable-speed motor 13 is stopped during running of the vehicle, and the pushing force is applied to the one end of the transmitting coil 9 by the follower wheel 11, the driving wheel 10, which was pushed by the other end of the transmitting coil 9, meshes with the one-way clutch 19 and idles. Thus, the transmitting coil 9 does not receive an excessive load, and damage is avoided.

If the brake pedal is depressed (a braking force applied) at that time, the output shaft 6 can be stopped in a state in which the transmitting coil 9 is separated from the drum 2.

It is possible to keep running the engine and the variable-speed motor 13 at a constant speed, and to automatically drive the vehicle without operation of the accelerator. At such a time, if the engine and the variable-speed motor 13 are released from the constant speed driving state by applying a braking or accelerating force, and the variable-speed motor 13 is stopped when the braking force is applied, it is possible to prevent the transmitting coil 9 from biting the drum 2, such that it is possible to prevent the engine from stopping.

The applicable examples of the present invention discussed above have been explained based on the drawings herein. However, the power transmitting apparatus of the invention is not limited to the above-described structure. For example, the driving wheel 10 may be mounted to the rotation shaft 1 through a bearing, and the one-way clutch 5 and the follower wheel 11 may be mounted to the outer periphery of the drum 2. Further, instead of arranging the output shaft 6 in series with the rotation shaft 1, they may be arranged in parallel and coupled to the follower wheel 11 through a gear. However, in the above examples, the output shaft 6 is shown as rotating in the forward direction only, but when the apparatus of the present invention is used as a transmission for an automobile, the output shaft 6 can be used as, e.g., a transmitting shaft for enabling the vehicle to run in reverse, the output shaft 6 may be connected to a main shaft through gears, and/or the main shaft can be rotated in both normal and reverse directions by meshing the gears.

As is apparent from the above, according to the present invention, since the continuously variable transmitting function described herein is obtained by utilizing the winding effect of the transmitting coil with respect to the drum, an impact at the time of speed change is eliminated, and the changing operation of the gear ratio is unnecessary. As such, the apparatus is extremely effective as a transmission for an automobile, the power of the drive source (engine) is efficiently transmitted to the output side especially at the time of acceleration, energy loss can be reduced, and such a structure is simplified as compared with conventional gear-type transmissions. Thus, the apparatus can be reduced in cost, size and weight.

Importantly, according to the present invention, the revolution number of the output side should not exceed that of the drum, and the transmitting coil is not damaged by the inertial force of the output side. Further, if the revolution number of the drum exceeds a given level, the centrifugal clutch operates to directly connect the input side and the output side and, therefore, it is possible to output the power of the drive source with almost 100% efficiency without using the variable-speed motor during high speed driving.

What is claimed is:

1. A power transmitting apparatus comprising:

a rotation shaft which obtains a power of a drive source and rotates in a predetermined direction;

a drum fixed to an outer periphery of said rotation shaft;

helical transmitting coils having a spring property mounted and wrapped around an outer periphery of said drum at constant clearances from one another;

a driving wheel provided on one end of said drum;

a follower wheel rotatably provided on an opposite side of said drum from said driving wheel, with said transmitting coils interposed therebetween, and mounted on said rotation shaft through a one-way clutch such that the revolution number of said follower wheel does not exceed the revolution number of said drum; and a variable-speed motor for rotating said driving wheel in the same direction as said drum, wherein a power of said drum is intermittently output to said follower wheel in a pulse transmitting manner through said transmitting coils by controlling a speed of said variable-speed motor, one end of each of said transmitting coils engages said driving wheel and a second end of each of said transmitting coils engages said follower wheel when a tensile force caused by rotation of said driving wheel is applied to one end of each of said transmitting coils, which thereby rotates said follower wheel in the same direction as said drum, and when the revolution number of said follower wheel exceeds a predetermined revolution number of said drum, a centrifugal clutch for rotating said driving wheel at the same speed as said drum is provided.

2. A power transmitting apparatus according to claim 1, wherein said driving wheel comprises an annular portion for surrounding said centrifugal clutch and teeth receiving a power from said variable-speed motor, said driving wheel being connected to said variable-speed motor through a transmission system having gear meshing with said teeth, and said transmission system further having excessive load-preventing means for idling said gear when power is transmitted from the side of said driving wheel to cut off the transmission of power to said variable-speed motor.

* * * * *